United States Patent

Petruzzi

[19]

[11] Patent Number: 5,806,049
[45] Date of Patent: Sep. 8, 1998

[54] DATA PROCESSING SYSTEM FOR GLOBAL ASSESSMENT OF INVESTMENT OPPORTUNITY AND COST

[76] Inventor: Christopher R. Petruzzi, 800 E. Ocean Blvd. Suite 1101, Long Beach, Calif. 90802

[21] Appl. No.: 893,579

[22] Filed: Sep. 30, 1996

Related U.S. Application Data

[63] Continuation of Ser. No. 436,803, May 2, 1995, abandoned, which is a continuation of Ser. No. 50,802, Apr. 21, 1993, abandoned.

[51] Int. Cl.$^6$ .................................................. G06F 17/30
[52] U.S. Cl. ................................................................. 705/36
[58] Field of Search ........................... 705/36, 10; 707/2

[56]  References Cited

U.S. PATENT DOCUMENTS

| | | | |
|---|---|---|---|
| 4,346,442 | 8/1982 | Musmanno | 364/408 |
| 4,674,044 | 6/1987 | Kalmus et al. | 364/408 |
| 4,722,055 | 1/1988 | Roberts | 364/408 |
| 4,752,877 | 6/1988 | Roberts et al. | 364/408 |
| 5,101,353 | 3/1992 | Lupien et al. | 364/408 |
| 5,132,899 | 7/1992 | Fox | 364/408 |
| 5,148,365 | 9/1992 | Dembo | 364/402 |

OTHER PUBLICATIONS

M. Waggener, *Optimal Portfolio Selection using Linear Programming*, Master of Arts Thesis, available at the Fullerton University Library, California State University, Fullerton, CA (1992).

*Primary Examiner*—John E. Harrity
*Attorney, Agent, or Firm*—Hopgood, Calimafde, Kalil & Judlowe, LLP

[57]  ABSTRACT

A data processing system for determining a matrix of optimal investment portfolios based on globally accessed investment return and risk criteria. The system creates a global defined database of investment assets and investors. Asset and investor characteristics are established and applied to provide solutions to the ensuing linear relationships. These solutions are then individually applied to determine an optimal investment portfolio on an individualized basis.

7 Claims, 5 Drawing Sheets

DATA PROCESSING SYSTEM FOR GLOBAL ASSESSMENT OF INVESTMENT OPPORTUNITY AND COST

RELATED APPLICATION

This application is a continuation of Ser. No. 08/436,803, filed May 2, 1995, now abandoned, which is a continuation of Ser. No. 08/050,802, filed Apr. 21, 1993, now abandoned.

This invention generally relates to a data processing system for optimizing strategic investment in portfolio management, and, more particularly, a globally defined data processing system that integrates select investor and asset criteria to determine an optimized mix of asset allocation on an individualized basis.

BACKGROUND OF THE INVENTION

The management of investment portfolios has taken on significant importance in recent years, particularly with the advent of many new and complex investment vehicles and the changing role of governmental taxation policies. It has been recognized that different individuals will have differing investment objectives and needs. It has also been recognized that many assets provide differing rates of return and levels of risk associated therewith. The intersection of these characteristics results in a mindboggling array of variables. To effect rational investing, there have been a plethora of computer systems designed to collect information regarding select investors and allocate the selection of investment vehicles to coordinate the risk/reward in a manner corresponding to each investor. These systems work on a microscopic approach and are subject to all the variances that working on individualized selection will create.

Within the past decade, it has become well-known that the investment vehicles available worldwide can be evaluated corresponding to individual investor's needs and level of desired risk. In essence, the available markets for investment have become truly global and are now subject to macro-investigation and analysis. This permits a more complete understanding and measurement of the available investment alternatives and permits consideration of governmental regulations, i.e., taxation policies, capital gains treatment, carry-over basis, etc. Only when an investment alternative is considered in the light of its competitive environment, in macro-economic terms, can a true assessment be made of its relative price—risk performance.

OBJECTS AND SUMMARY OF THE PRESENT INVENTION

It is an object of the present invention to provide an improved system for selectively analyzing available investment vehicles on a global basis and determining an optimal asset allocation for individual portfolios.

It is another object of the present invention to provide a data processing implementation for an investment management system which recommends purchases and sales for investment portfolios based on the aggregate supply of different available assets and the attributes of those assets along with the aggregate wealth of potential investors and the different characteristics of each of those potential investors.

It is yet another object of the present invention to determine the optimal allocation of the available assets among the entire population of potential investors. This optimum defines the implicit prices of the asset attributes in the context of market performance, i.e., global supply and demand.

The above and other objects of the present invention are realized in specific illustrative improved investment management system for global optimization of portfolio allocation. The system evaluates specific asset attributes such as the federally taxable income produced by the asset, the taxable income produced by the asset under the rules of various states, the cash flow produced by the asset, the life of the asset, the need for monitoring of asset's performance and management, and statistics concerning the risk of the asset both alone and in conjunction with other assets in the investor's portfolio. These attributes are optimized over potential investors considering the investors' characteristics such as the investors' federal tax rates, the investors' tax rates from various states, the investors' desires for cash flow, the investors' costs of brokerage, the investors' costs of monitoring investment performance, the investors' tastes for risk and the risks which are inherent in the investors' incomes, wealth, and consumption patterns. In particular, the investors' current portfolios and the costs of maintaining and changing those portfolios are considered in the global optimization.

The global optimization is solved as an allocation problem using the well-known tools of linear programming. The solutions from linear programming provide implicit prices of the investment attributes, and those implicit prices are applied with the characteristics of a subject investor to find the optimal purchases and sales of the subject investor on an individualized basis.

The foregoing and additional features and advantages of the instant invention will become more readily apparent from the following detailed description of a specific illustrative embodiment thereof, presented herein below in conjunction with the accompanying drawing, in which:

DESCRIPTION OF THE FIGURES

FIG. 1 is a schematic flow chart depicting the data processing methodology and structure in accordance with the principles of the present invention;

FIG. 2 is a flow chart depicting the data processing for the proper input of asset lists and values along with lists of investor groups and their portfolios so that the data meets criteria necessary for optimization with linear programming techniques;

FIG. 3 is a flow chart depicting the data processing for the proper input of asset attributes and investor characteristics for the relationships which depict the costs of the attributes of each asset;

FIG. 4 is a flow chart depicting the data processing for an iterative process, computing successive linear solutions for optimal asset allocation with small increments of portfolio change in each iteration, and computation of duals to the final optimal allocation; and FIG. 5 is a flow chart depicting the data processing for inputting the characteristics and initial portfolio of the subject investor, and computing an equation showing the subject investor's disutility from asset attributes.

DESCRIPTION OF THE PRESENT INVENTION

By way of brief overall philosophy, asset allocation for the gain of a subject investor can be viewed as a competitive endeavor. If different subject investors are competing in only one dimension (such as maximization of their pre-tax return), then the game is a zero sum game in which any investor is able to realize superior performance only at the expense of other investors realizing inferior performance. If all investors are rational, no one will compete in this game since a rational investor would only compete with the expectation of realizing superior performance, and it would be impossible for all competitors in the game to simultaneously have that expectation. While there may be some rational investors who choose to compete in this game at the expense of irrational and naive investors, irrational investors are likely to be sufficiently scarce that investment markets are more likely to be dominated by rational investors, and the vast majority of rational investors should not engage in this one dimensional competition. The cross-section of subpopulations affecting decision making is portrayed in the illustrative thesis prepared by Matthew Waggener, under the applicant's tutelage, and is available at the California State University, Fullerton University Library, M. Waggener, *Optimal Portfolio Selection Using Linear Programming*, Master of Arts Thesis, Library, California State University, Fullerton, Apr. 28, 1992 (the contents of which are incorporated herein by reference).

In an investment market dominated by rational investors, differences in portfolio allocation along with differences in purchases and sales will depend on the comparative advantages of different investors for different assets. Each asset has certain attributes, such as taxability of income, cash flow, monitoring requirements, and risk statistics, the exact combination of which are probably unique to that asset. Similarly, each group of investors has certain characteristics such as tax rate, desire for cash flow, costs of monitoring, tastes for various risks, and an initial endowment of assets and incomes which are unique to that investor group.

In a competitive market with visible prices for investment attributes, rational investors will compete to acquire or avoid various attributes by bidding up or down the prices of the assets which have those attributes. Eventually the investment attributes will be allocated among the different investors by the competitive market in much the same way that consumer's goods are allocated in a market economy. After all mutually profitable exchanges are made each investor will own the portfolio of investments which maximizes the subject investor's utility, given the prices of the investments, and the overall utility of all of the investors will be at a pareto maximum.

The problem with applying this solution to portfolio allocation is that the prices of investment attributes are not visible. While numerous researchers have attempted to discern the prices of those attributes through statistics on the rates of return of various investments, there is so much noise in the return of any group of investments that any estimate of attribute prices based on past rates of return is highly questionable. Nonetheless, the demand by investors and investment advisers for information on the prices of investment attributes is so great that millions of dollars are spent on software and services which attempt to find the prices of asset attributes based on statistics of investment returns.

An alternative method for finding the prices of asset attributes is to begin by finding the optimal allocation of the universe of assets across the universe of potential investors. To the extent the value of each asset, the asset's attributes, the wealth of each investor group, and the characteristics of the group which make the attributes more or less desirable can be individually estimated, application of linear programming techniques produces a global solution. The dual of that linear solution shows the prices of the investment attributes not in dollar or other currency terms, but relative to each other. Since each investor is compensated for undesirable attributes in the investor's portfolio at prices shown by the dual, the investor is willing to hold the investments with undesirable attributes in the amounts shown by the globally optimal solution. Hence, the global optimum is also a series of individual optimums. The implicit prices of asset attributes from the dual can then be applied to compute an optimal asset allocation for any subject investor whose characteristics of producing utility or disutility from the attributes are known.

Since each investor is likely to be concerned with the risk from the overall variation in the investor's portfolio, and the effects of any one asset on that overall variation depend on the other assets in the portfolio, both the globally optimal asset allocation and the optimal asset allocation for the individual subject investor must be made by an iterative process in which each computation only makes small changes from the previous portfolio. The portfolio risk of each new increment may be then based on the composition of the portfolio prior to that increment, for a close approximation of the actual portfolio risks of the new increment.

Figure 1:
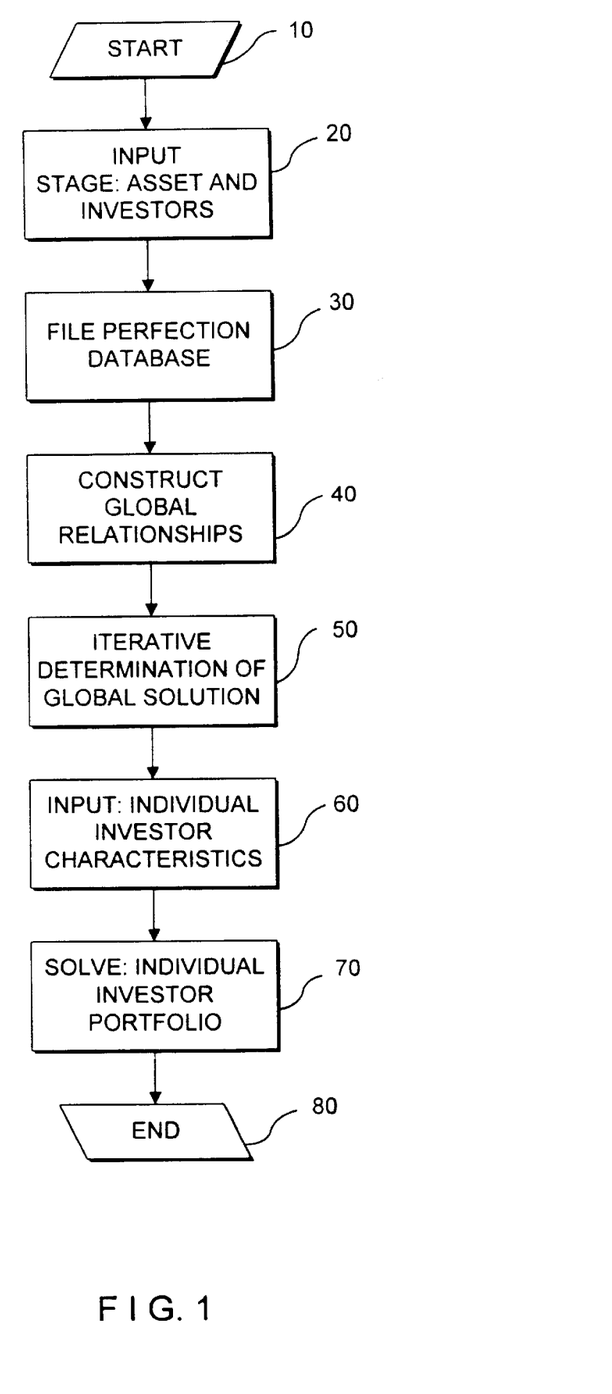

Referring now to FIG. 1, there is shown in overall scope a data processing and system operational flow chart for implementing an improved system for portfolio analysis incorporating the principles of the present invention. As contemplated by the present invention, the user enters data on the universe of assets which are available for investment and the universe of potential investors in those assets, block 20. This data is selectively absorbed into a fluid database forming a universe of investments and bidding investors, block 30. This data is then used to formulate the governing linear programming relationship, block 40. The solution to this relationship is iteratively processed, extrapolating a global distribution of relative price constructs based on the inputted attributes, block 50.

The global solution is then applied to individual investors to provide an optimal matrix for select individuals. This process begins with the entry of the individual investor's personal profile into the system which is stored in memory, block 60. These individual investor attributes are then applied to the global relationship to create the optimal mix of investments forming the individual investor's portfolio matrix, block 70. This process is repeated for each investor until complete, block 80. The characteristics of a subject are input, and the solution to the problem of global asset allocation is applied to determine optimal purchases and sales for the subject investor. A miscellaneous category may be created to include sundry traded assets which do not fit into any other asset category.

Figure 2:
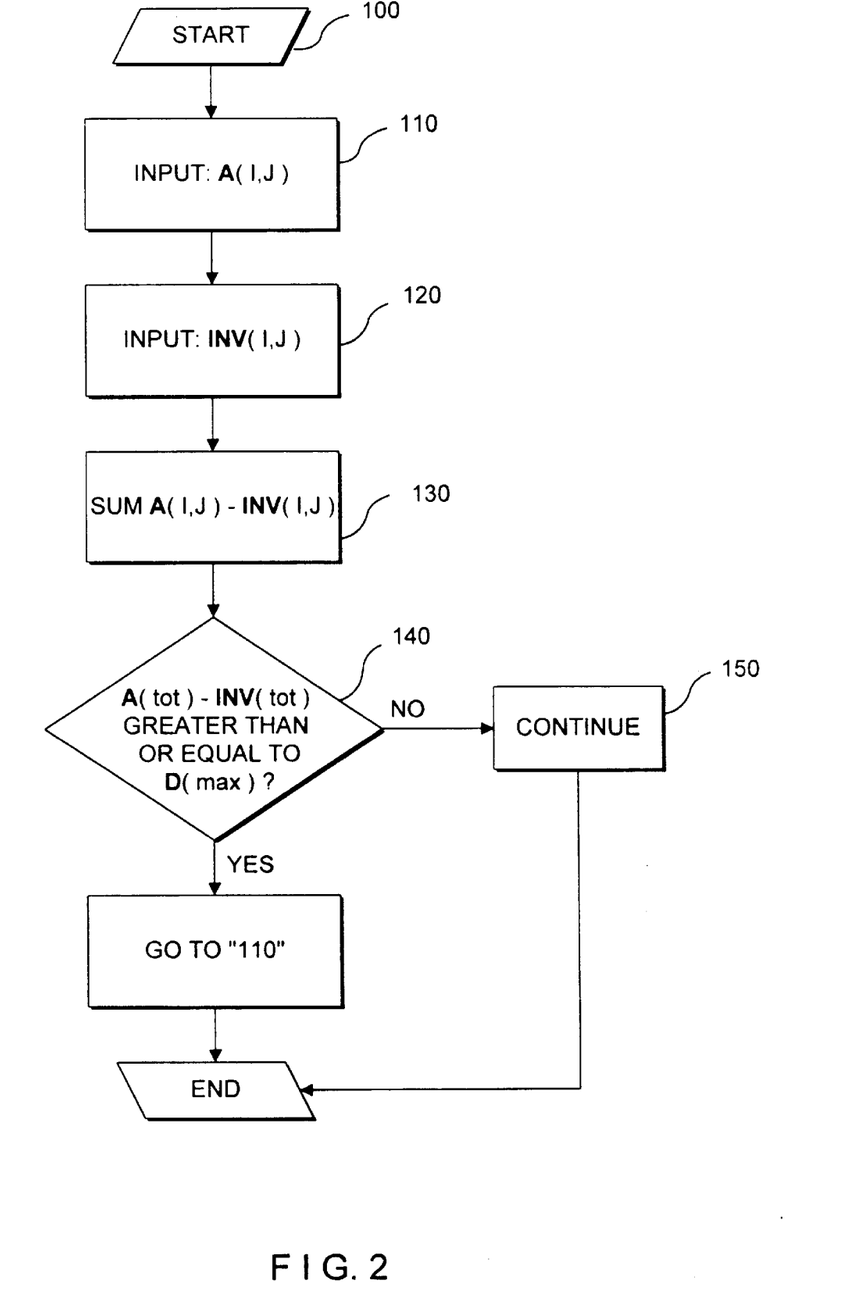

With the foregoing overview in mind and referring to FIG. 2, the entry of global data is depicted wherein the cumulative available assets, A(I,J), and available population of investors, INV(I,J), are inputted into system memory. For this discussion, counter variables I, J and K are used to track the assets, investors and periods, respectively. While data on ownership and values of broadly defined assets (such as common stocks) is more readily obtainable, the assets should be defined as narrowly as the data permits. Similarly, the investor groups may be broadly defined groups (such as individuals over age 65), but more narrowly defined when the data permits. A "miscellaneous" category may be created to include sundry investors or assets that do not fit into any other broad category.

The individual values for A(I,J) and INV(I,J) are entered in blocks 110 and 120. These are summed, block 130, and tested via convergence criteria, Dmax, at block 140. Since a premise of the computation is that the portfolios of the investors comprise exactly 100% of the available assets, satisfaction of the convergence criteria exists if the investors own about 100% of the assets; if not, the process is repeated until the criteria is met.

Figure 3:
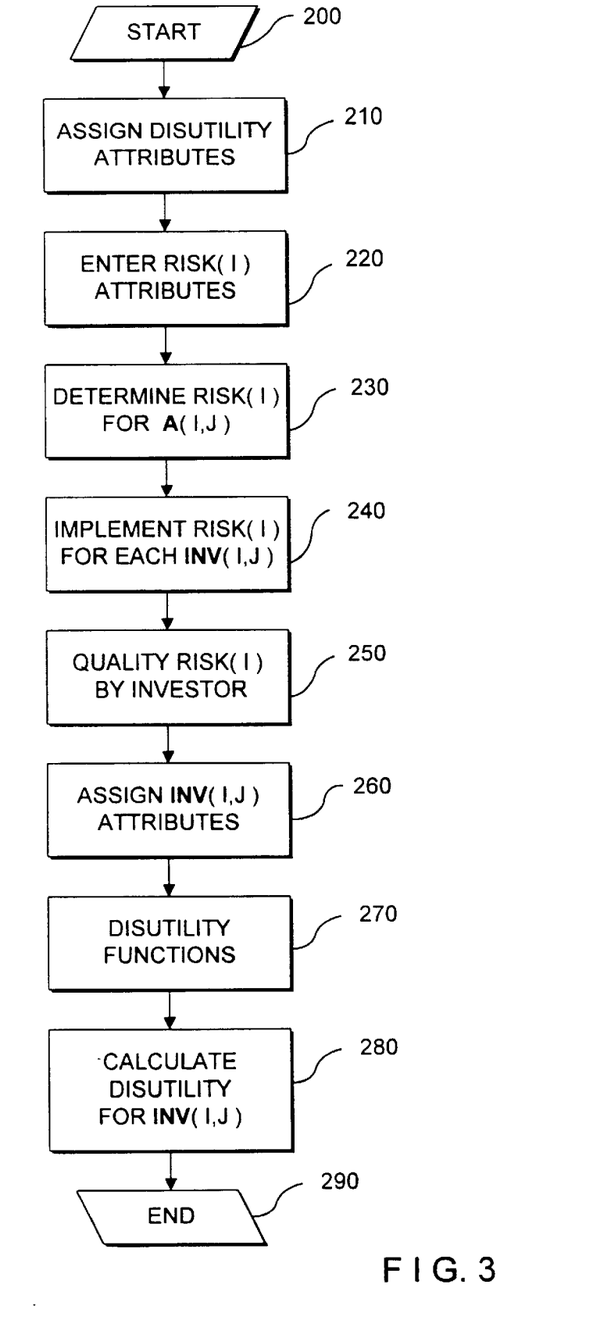

Referring now to FIG. 3, there is shown a detailed flow chart for computing the disutility of investors from the attributes of portfolio assets, based on the investors' characteristics. The computation is one for disutility rather than utility since many of the observed attributes of an asset (need for brokerage or generation of taxable income) are more easily formulated into an equation for disutility than an equation for utility. The user begins by inputting the observed attributes of each asset group, such as the taxability of income, cash flow and monitoring needs, block 210. For the most part, these may be estimated from publicly available statistics, although some attributes (such as monitoring needs) may require more interpretation on the part of the user.

At block 220, the user inputs data for determination of the risk statistics for each asset. These statistics will include the variance in rate of return of the asset as well as statistics which will allow the estimation of portfolio risk when the asset is combined with other assets. This latter set of statistics will generally be comprised of co-variances and factor co-efficients such as are available from published models. These risk statistics are assigned to the investment assets and stored in the database, block 230.

At block 240, the system computes the risk statistics of the current portfolios of each investor group, based on the statistics for asset risks in block 230. At block 250, the user inputs the estimations of risk aversion of each investor group. This risk aversion will include as estimate of general risk aversion based on empirical studies of the different groups as well as aversion to specific risks (such as inflation) which are likely to be represented by the factor co-efficients from block 230. The risk aversion will be expressed in units showing the incremental percentage return which the investor would be willing to trade for each unit of portfolio risk.

At block 260, the user inputs estimates of the other characteristics of each investor group such as the tax rates on federally taxable income, the tax rates from various states, the costs of brokerage for the investor and the costs of monitoring investment performance for various types of investments.

The system then computes each investor's disutility as a function of the assets in the investors' portfolios, block 270. The disutility of each investor is equal to the amount invested in the asset multiplied by each attribute of the investment, further multiplied by the investor's characteristic pertinent to the attribute. For example, an investment will produce taxable income at a certain rate (such as five percent per year, and the investor will pay federal taxes at a rate such as thirty percent per year, so if the investor group invests $100 billion in that asset the aggregate disutility is $100 billion multiplied by 0.05 multiplied by 0.30/year or $1.5 billion per year. The disutilities from other attributes in combination with their pertinent characteristics can be computed in a similar manner. These equations are applied at block 280 to compute each investor's disutility from the investor's current portfolio.

Figure 4:
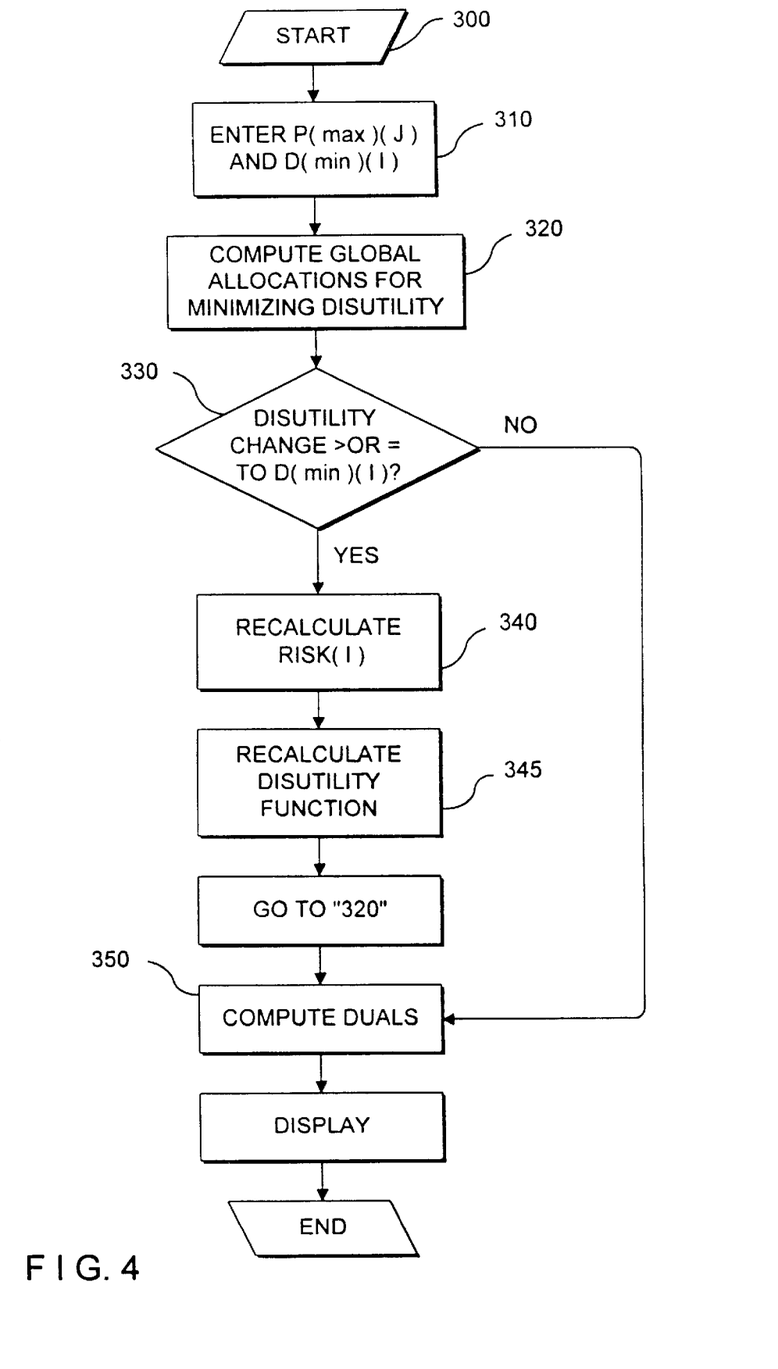

Referring now to FIG. 4, there is shown a detailed flow chart for finding the linear programming solution to optimal global asset allocation. Starting with block 210, the user inputs the maximum size for each portfolio change, Pmax (J). The size of each portfolio change must be small relative to the entire portfolio and the difference in risks among the different investment groups, so that the determination of changes in portfolio due to changes in the portfolio's assets can be estimated entirely from the portfolio's composition prior to the change. The accuracy of this method will be approximately equal to one minus the maximum percentage change allowed in the portfolio, so that if the maximum percentage change allowed is 1%, this method will be approximately 99% accurate. Experimentation indicates that portfolio size changes of from 0.1% to 1% will be appropriate for most investors under most circumstances. Also, at block 310, the user must input the minimum disutility increment for each portfolio change, Dmin (I).

Pursuant to these values and the previously established disutility functions, the system computes minimum portfolio utility, block 320. More particularly, if the previous portfolio change decreased disutility by an amount at least equal to the minimum utility increment, then the system will repeat the process for another portfolio change. This will continue until the most recent portfolio change has decreased disutility by less than the minimum increment. Since, in general, each portfolio change will decrease disutility by less than the previous change, this process will compute the most important changes, and quit computing changes only when the value is of minimal importance. This process is iteratively presented by test 330 and blocks 340 and 345, wherein factors in the original equations are adjusted (see below). Experimentation indicates that appropriate values for changes in disutility will generally range from one ten thousandth of one percent to one hundred thousandth of one percent of the original disutility.

The calculation of the asset allocation which produces minimal global disutility is accomplished with the tools of linear programming which are generally available as modules from various software writers. The disutility equations for the groups of investors which were calculated at block 280 will be added together to produce a global disutility equation. The objective function of the linear program will be to minimize the global disutility, subject to constraints that the amount invested in each asset is equal to the value of the asset, each investor's wealth is equal to the total value of the investor's net assets, and the changes from the initial asset allocation total no more than the maximum allowed change from block 310.

Test 330 compares the disutility of the new asset allocations with the disutility of the previous asset allocations to determine if the new allocation has decreased disutility by so much that a new calculation of optimal asset allocations should be computed, or if the comparisons should be stopped. A positive response to test 330 directs system logic to blocks 340 and 345 for new computations, as the previous computation decreased disutility by an amount at least equal to the minimum.

When a calculation takes place which decreased disutility by less than the minimum, the results are stored and duals of the attributes are calculated by the linear programming module, block 350. The duals are then displayed and/or sent to a printer, block 360.

Figure 5:
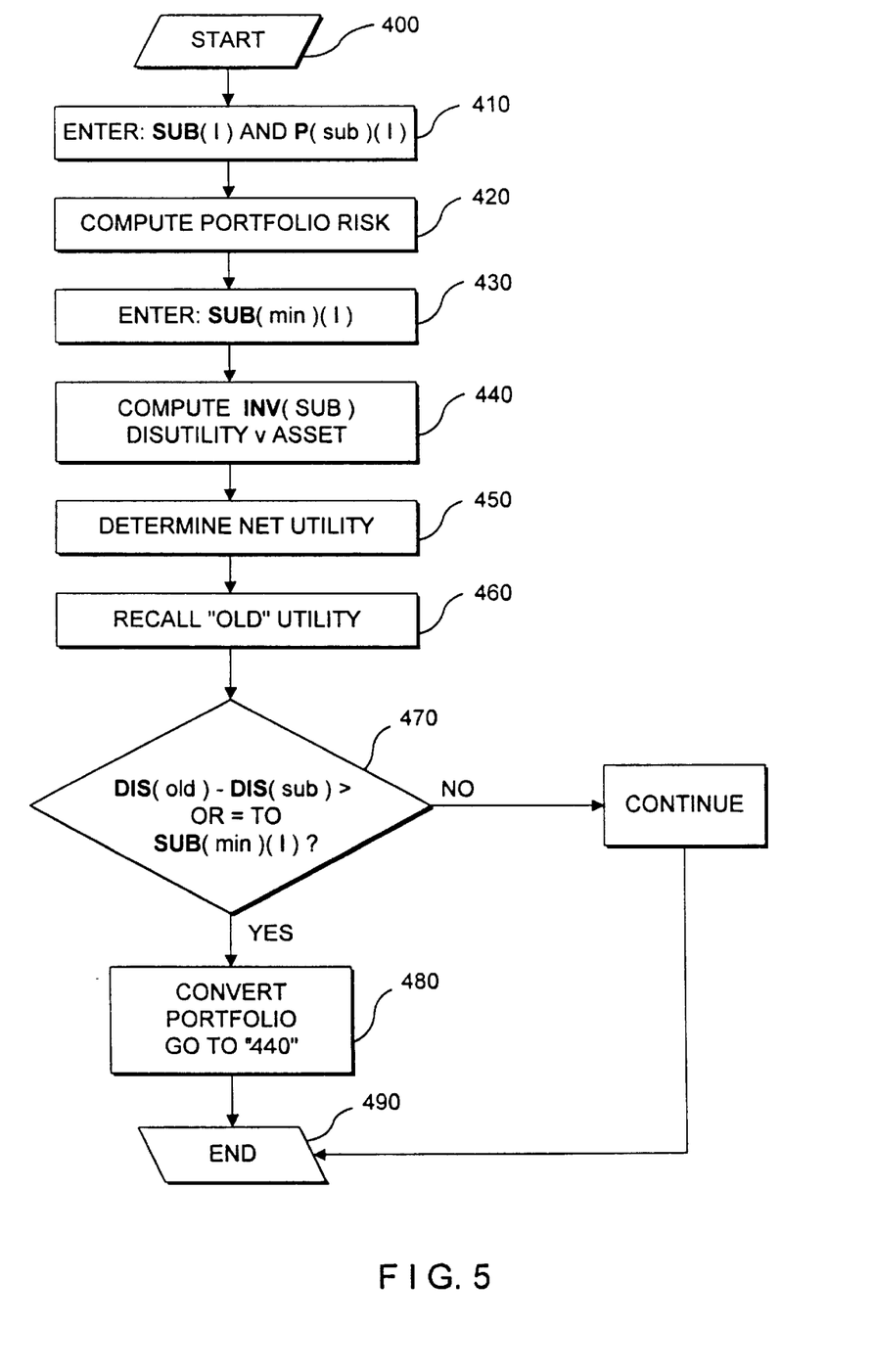

Referring now to FIG. 5, there is shown a detailed flow chart for inputting the portfolio of the subject investor and pertinent characteristics of that investor, Sub(I), computing risk statistics for the subject investor's current assets and portfolio, and then using that information along with the duals from FIG. 4 to compute optimal changes in the subject investor's portfolio.

The user first inputs characteristics for the subject investor, block 410, and these characteristics may be more detailed than the characteristics which were inputted for investor groups in FIG. 3. The subject investor's characteristics will include variables such as the investor's federal tax rate, the rate of taxation by any state, the investor's cost of brokerage, the investor's costs of disposing of any current assets (including capital gains taxes and other taxes in those disposition costs), the investor's need for cash flow in the immediate future and the expected future changes in the need for cash flow, costs of monitoring and risk aversion.

In addition, the user must input the maximum size change for portfolio changes, block 430, which will have a function similar to the maximum size change in FIG. 4, but applied to the subject investor rather than the global model. Experimentation indicates that maximum portfolio size changes of from 0.01% to 0.1% will be appropriate for most investors under most circumstances. The user must also input a minimum utility increment which will have a function similar to the minimum utility increment in FIG. 4, but applied to the subject investor rather than the global model. Experimentation indicates that appropriate values of the minimum utility increment will generally range from one hundred thousandth of 1% to one millionth of 1%.

The system then accesses the current portfolio of the subject investor, including the value of each asset, and proceeds to compute risk statistics for the portfolio using the risk statistics for each asset. The system thereafter computes the subject investor's net disutility, at block 440, from the current portfolio based on the investor's characteristics, the attributes of the assets, and the compensation expected for holding the asset as determined in the duals from FIG. 4.

The system computes a net utility to the investor from changing each asset by the maximum size change, block 450. This is determined by finding the net disutility of the current portfolio and then finding the net disutility of the portfolio if an asset is reduced by the maximum size change. This is performed for each asset until a net incremental utility for each asset is determined. The system then ranks assets by net disutility and creates a new portfolio in which the asset with the highest net disutility is reduced by the maximum size change and the asset with the least net disutility is increased by the maximum size change. The net disutility for the new portfolio is then computed and stored.

The net disutility of the new portfolio is compared with the net disutility from the previous portfolio, block 460 and test 470. If the decrease in net disutility is at least equal to the minimum utility increment, then the system repeats the process of asset replacement, block 480. If the net decrease is less than the minimum utility increment, then the system ceases to make new computations, block 490. At that point, the recommended sales and purchases are displayed to the user.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a data processing system for determining an optimum matrix of investments for a select individual portfolio, said system comprising:

a) means for storing in accessible memory a database on available investment assets and characteristics of said assets relevant to investment therein, said characteristics including current ownership of said assets, anticipated changes in the quantity available of each asset, and anticipated variations in the return of each asset;

b) means for storing in accessible memory a database on a population of investors, further categorized by groups having similar investment criteria, wherein said population of investors are further delineated by attributes comprising tax rates, cost of brokerage, cash flow requirements and aversion to variation in portfolio returns, said database including current portfolios of said investors, anticipated changes in the net worth of each investor group and anticipated changes in the attributes of each of said investors;

c) data processing means for establishing a matrix of relationships describing a relative incremental disutility to each of said investors of said characteristics associated with each of said investment assets, said data processing means comprising linear programming which accepts inputs of said characteristics of each asset group and attributes of each investor group, said linear programming capable of computing risk statistics of the current portfolios and recommended changed portfolios of each investor group based on the inputted characteristics and attributes, said linear programming further determining said matrix of relationships forming a global solution minimizing global disutility of all investor groups; and d) said data processing means further establishing an optimized individual portfolio based on select investor criteria and said matrix of relationships.

2. The system of claim 1, wherein said optimized individual portfolio avoids corner solutions by forcing a level of diversity in said portfolio through the use of a factor expressing the elimination or reduction of portfolio variance as measured by the change in the sum of the covariances of individual assets with exogenous macroeconomic variables.

3. The system of claim 2, wherein said system utilizes an iterative process, said process is repeated as long as utility is increased and there is either a minimum size to each change, a cost associated with each change, or a minimum incremental utility from each change in order to avoid creating an infinite loop.

4. The system of claim 3, wherein infinitely repeating loops are avoided by not repeating said iterative process of portfolio changes after a portfolio change has failed to decrease dis-utility or increase utility by a fraction of more than one hundred thousandth of a percent (0.0000001) of the original utility.

5. The system of claim 2, wherein said corner solutions are avoided by restricting each incremental portfolio change for determination of individual optimal solutions to less than 0.001 of the total portfolio value.

6. A data processing method for optimizing an individual investor's portfolio, said method comprising the steps of:

a) creating a first database of investment assets and investor groups wherein total assets are equal to total combined portfolios for the investor groups both in total and for each individual asset;

b) creating a second database associated with said first database that provides select characteristics for each investment asset and each investment group, said characteristics including cost of brokerage, tax rate, cash flow, monitoring costs, components of variance, anticipated changes in net worth of each investor group, anticipated changes in attributes of each investor, anticipated changes in the quantity available of each asset and anticipated changes in the characteristics of each asset;

c) calculating the relative disutility for each investment asset based on said characteristic;

d) calculating a relative disutility to each investor for each investment asset based on said characteristics, said calculating based on data processing means comprising linear programming which accepts inputs of said characteristics of each asset and attributes of each investor group, said linear programming capable of computing risk statistics of the current portfolios and recommended changed portfolios of each investor group based on the inputted characteristics and attributes, said linear programming further determining a global solution minimizing global disutility of all investor groups;

e) determining with a simultaneous solution an optimal mix of investments for each investor group, based on said calculated disutility for each asset and each investor group; and f) determining an optimum portfolio for an individual investor based on said disutility calculations and said optimized investor group portfolios.

7. The method of claim 6, wherein said steps (c) and (d) provide a series of disutility functions expressing a relative cost of an investment asset in terms of other investment assets stored in said second database.

* * * * *